INVENTOR
WILLEM EBBINGE
BY
AGENT

INVENTOR
WILLEM EBBINGE
BY
AGENT

United States Patent Office 3,344,624
Patented Oct. 3, 1967

3,344,624
AUTOMATIC WASHING MACHINE
PROGRAM CONTROLLER
Willem Ebbinge, Emmasingel, Eindhoven, Netherlands, assignor to North American Philips Company, Inc., New York, N.Y., a corporation of Delaware
Filed Aug. 12, 1965, Ser. No. 479,258
Claims priority, application Netherlands, Aug. 14, 1964, 64—9,363
11 Claims. (Cl. 68—12)

This invention relates to automatic washing machines, and more particularly to a washing machine having a program controller which provides a rinsing program consisting of a cycle of successive actions.

A rinsing cycle usually consists of the following steps: (1) filling the washing machine with rinsig water, (2) the actual rising process, (3) emptying the machine.

An object of the invention is to provide a rinsing process in which the cycle is automatically performed and is then automatically repeated a few times.

For that purpose the invention is characterized in that an optical coupling exists between a light source connected in a time circuit which determines the total rinsing time, and a photosensitive resistor in a circuit which causes the washing machine to be filled with water to a given level. The resistor is included between one of the terminals of the supply voltage source and the input circuit of the last-mentioned circuit.

According to a further aspect of the invention, a second photosensitive resistor is connected in series with the said pohotosensitive resistor. The second resistor is illuminated for a short period of time at the end of each cycle by a light source coupled to the output circuit of the circuit which is responsible for emptying the washing machine.

Figure 1:
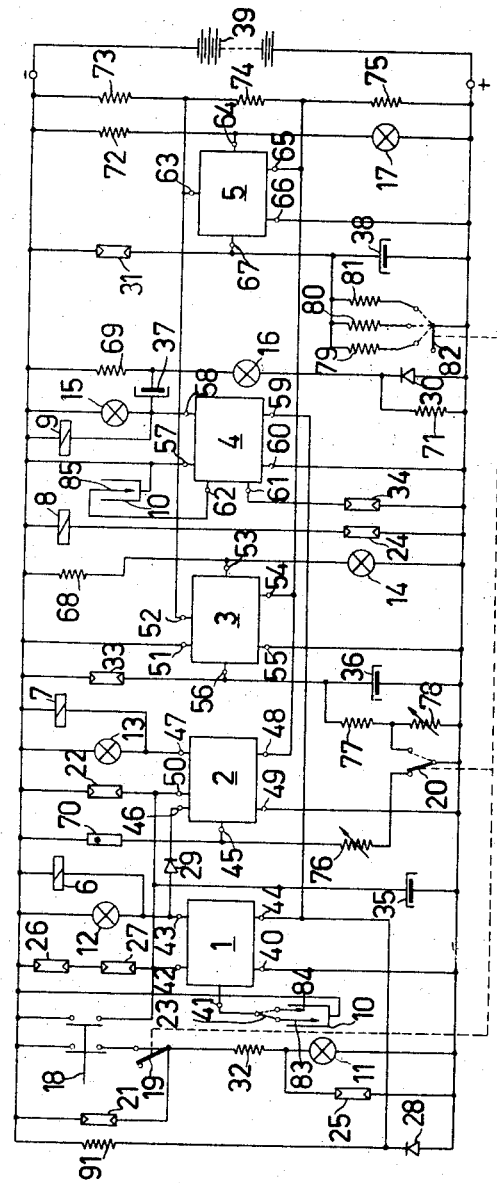

In order that the invention may readily be carried into effect, it will now be described in greater detail, by way of example, with reference to the accompanying drawing, in which, FIGURE 1 is a circuit diagram of a washing machine according to the invention, and FIGURES 2, 3, 4, and 5 show details of the circuit diagram shown in FIGURE 1.

In FIGURE 1, the voltage source 39 supplies the parallel arrangement of a number of separate circuits 1-5 which each perform a given function and which are coupled together by the cooperation of light sources and photosensitive resistors in a manner such that the desired operations are performed in the correct sequence.

In order to perform a rinse cycle, the switches 19, 20 and 23 assume the position which is indicated by the broken lines. The switch 82 assumes the position which is indicated by one of the broken lines.

When the push-button 18 is moved to the right from the position shown, the circuit 1 is switched on and the relay 6 is then energized. The relay 6 controls the supply of water to the container 10 which is filled to the height indicated by the arrow 84.

The light source 12 is connected parallel to the relay coil 6 and illuminates the photosensitive resistor 22, which shunts the push-button 18 in the closed position. The task of the push-button switch is partially taken over by the resistor 22 and partially by the resistor 21.

When the push-button 18 is moved to the right, the light source 11 is connected to the supply voltage through the resistor 32. The lamp 11 illuminates the photosensitive resistor 21 which shunts the push-button 18 in the closed position. When the push-button 18 is returned to its original position, the low-ohmic resistor 21 keeps the lamp 11 ignited.

When the desired height of the rinsing water in the container 10 is reached, the relay coil 6 and the lamp 12 substantially pass no current. Because switch 20 is in the right hand position, the connection between the terminal 45 and the positive terminal of the voltage source across 39 via the resistor 76 is interrupted. During the entire rinse cycle, the circuit 2 is thereby held in the condition in which the heater relay 7 passes no current.

The photosensitive resistor 33, which is also illuminated by the light source 12, is low-ohmic during the time the container 10 is filled with rinsing water. The capacitor 36 is constantly charged through the resistor 33.

At the conclusion of the filling cycle the light source 12 extinguishes, the resistor 33 becomes high-ohmic and the capacitor 36 begins to discharge via the resistor 77. The discharge time and consequently the rinsing period is comparatively short. When the capacitor 36 has wholly or for the greater part discharged, the potential of the terminal 56 assumes a value which influences the circuit 3 in a manner such that the said circuit presents current to the terminal 53. The voltage drop which this current produces across the resistor 68 gives the terminal 53 a potential which is insufficient to keep the light source 14 ignited. Therefore, the photosensitive resistors 24 and 34 optically coupled thereto become high-ohmic. The rinsing relay 8 is switched off because the resistor 24 becomes non-conductive. The circuit 4, as a result of the resistance variation of the photosensitive resistor 34, passes into the condition in which the terminal 58 assumes a potential such that the pumping relay 9 is energized.

The container 10 is emptied. During emptying the terminal 62 is connected to the negative terminal of the voltage source 39 through the contact 85. This connection is interrupted when the container 10 is empty, or nearly empty. The potential of the terminal 62 now varies in a manner such that the circuit 4 passes into the condition in which little or no current flows out of the terminal 58. As a result a negligible voltage drop is produced across the relay coil 9 and the relay 9 is switched off.

During the time the container 10 is being emptied, the light source 15, connected parallel to the relay coil 9, is ignited. The photosensitive resistor 25 is illuminated by the lamp 15 and consequently is low-ohmic. As a first result, the lamp 11 is extinguished and remains extinguished because the photosensitive resistor 21, which is in an optical contact with the lamp 11, now becomes high-ohmic. Secondly, the photosensitive resistor 31, which is illuminated by the lamp 11, and through which resistor the capacitor 38 was charged, also becomes high-ohmic. The capacitor 38 begins to discharge through a network which contains one of the resistors 79, 80 and 81, depending on the position of switch 82.

The switching off of the relay 9 is effected rather abruptly. The capacitor 37 is charged by the voltage pulse formed at the terminal 58. The charge current traverses the light source 16 which illuminates for a short time the photosensitive resistor 26 in series with the photosensitive resistor 27. The resistor 26 becomes low-ohmic for a short period of time and the potential at the terminal 42 of the circuit 1 is such that the circuit passes into the condition in which the container 10 is filled again. So the cycle is repeated over and over again until the capacitor 38 has discharged wholly or for the greater part. When this occurs, the circuit 5 passes into the condition in which current is presented to the terminal 64 and the lamp 17 extinguishes. The resistor 27 optically coupled to lamp 17 consequently becomes high-ohmic. The container 10 can no longer be filled unless the switch 18 is closed.

The RC timing network that includes the capacitor 36, may also serve to determine the washing time, as explained in greater detail in a copending United States application 479,177. For rinsing purposes it serves repeated times.

Figure 2:
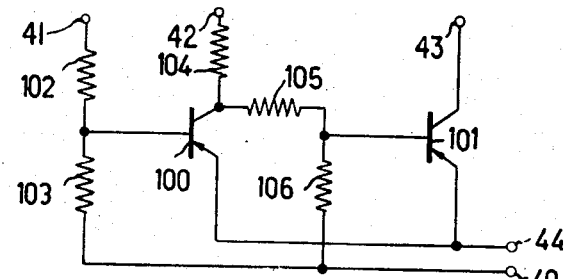
Figure 3:
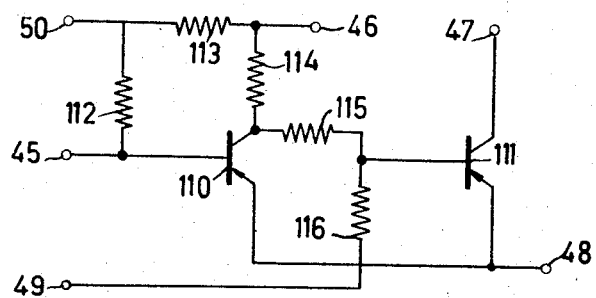

FIGURE 2 shows the circuit 1 in greater detail. The transistor 100 is non-conducting when the terminal 41 is floating, that is when the water level in the container 10 has not yet reached the desired value. The transistor 101 is conducting so that a current becomes available at the terminal 43 which ignites the light source 12 and switches on the relay 6. When the desired water level is reached, the terminal 41 is immediately connected to the negative terminal of the voltage source 39. The potentiometer 102, 103 now sets up a potential at the base of the transistor 100 such that the transistor becomes conductive. In turn, across the resistor 104 a voltage drop is produced which increases the base potential of the transistor 101. The transistor 101 becomes non-conductive and the relay 6 is de-energized.

Figure 4:
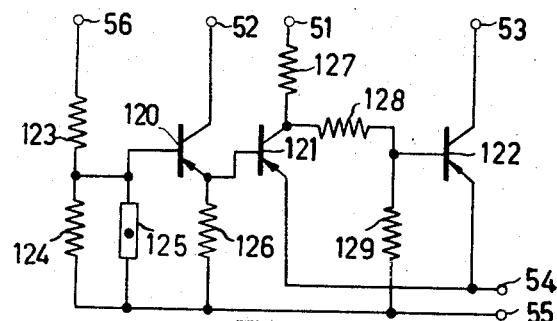

FIGURE 4 shows, together with the capacitor 36 which is charged through the photosensitive resistor 33 and which is connected to the terminal 56, the circuit 3 which determines the rinsing time per cycle. The rinsing time begins when the resistor 33 assumes a high-ohmic value, which occurs right after completion of the filling of the container 10. The base of the transistor 120 then has a potential which is negative with respect to the emitter potential. Transistor 120 is conductive as is the transistor 121. The voltage drop across the resistor 127 is large so that the base potential of the transistor 122 is positive with respect to the emitter potential. The transistor 122 is cut off and the voltage at the terminal 53 is determined only by the resistor 68 and the resistance of the light source 14.

During the rinsing cycle, the capacitor 36 discharges by means of the parallel arrangement of the resistor 77 and of the part of the network consisting of the resistors 123, 124 and 125. During the discharge of the capacitor 36, the base potential of the transistor 120 increases. When the capacitor 36 has discharged to a given level, the base potential of the transistor 120 becomes so high that the transistor 120, and consequently also the transistor 121, pass into the cut off condition. The voltage drop produced across the resistor 127 by the collector current of transistor 121 disappears entirely, or substantially entirely, so that the base potential of the transistor 122 becomes more negative. The transistor 122 becomes conductive which causes a voltage drop across the resistor 68 which greatly reduces the voltage across the light source 14.

Figure 5:
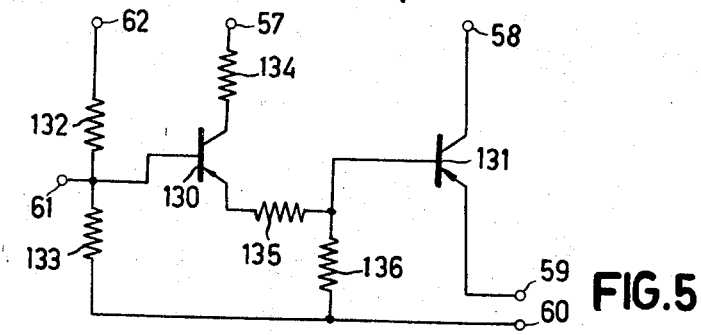

FIGURE 5 shows the circuit arrangement 4 by means which the container 10 is emptied. The photosensitive resistor 34 connected in parallel with the resistor 133 is low-ohmic during the filling and rinsing cycles because the lamp 14, which illuminates the resistor 34, then is ignited. The transistor 130 is cut off because its base is connected through the substantially negligible resistor 34 to the positive terminal of the voltage source 39. The transistor 131 is non-conductive for the same reason. However, at the end of the rinsing cycle the resistor 34 becomes high-ohmic because light source 14 is then extinguished. The potentiometer 132, 133 is designed so that the base potential is reduced to a value such that the transistor 130 becomes conductive. As a result of the voltage drop produced across the resistor 136 by the emitter current of transistor 130, the transistor 131 also becomes conductive. The relay 9 is energized and emptying of the container 10 begins.

When the container 10 is emptied, the terminal 62 is no longer connected to the negative terminal of the voltage source 39. The base potential of the transistor 130 becomes more positive. The transistor 130, and consequently the transistor 131, pass into the cut-off condition. The relay 9 returns to the rest condition.

The circuit 5 of FIG. 1 is analogous to the circuit 3 showns in FIG. 4 and needs no further explanation here.

The total number of cycles which make up a complete rinsing program is determined by the time it takes for the capacitor 38 to discharge. The actual rinsing period within one rinse cycle is determined by the time it takes for the capacitor 36 to discharge.

In one embodiment of the invention, the photosensitive resistors 21, 22, 24, 25, 26, 27, 33 and 34 were of an experimental type. The lamps 11, 14, 16 and 17 had an operating voltage of 6 volts and an associated current of 40 ma. The lamps 12, 13 and 15 had an operating voltage of 24 volts and an associated current of 40 ma. The diodes 29 and 30 were of the type OA85 and the diode 28 was of the type OA210. The resistors 31, 32, 68, 69, 71, 72, 73, 74 and 75 were 470, 330, 470, 1500, 1000, 470, 220, 18 and 7Ω, respectively. The capacitors 35, 36 and 38 were 250, 1000 and 1000 μf. respectively. The voltage source 39 supplied a voltage of 24 v.

The transistors 100, 101, 110, 111, 120, 121, 122, 130 and 131 were of an experimental type. The resistors 102, 103, 104, 105 and 106 were 10KΩ, 3.9 KΩ, 5.6KΩ, 1.8 KΩ, and 1.8 KΩ, respectively. The resistors 112, 113, 114, 115 and 116 were 150 KΩ, 2.7 KΩ, 2.7 KΩ, 100 and 470Ω. The resistors 123, 124, 126, 127, 128 and 129 were 33 KΩ, 270 KΩ, 4.7Ω, 8.2Ω, 3.3Ω and 4.7Ω, respectively. The resistors 132, 133, 134, 135 and 136 were 10Ω, 3.9Ω, 4.7Ω, 470 and 470Ω respectively.

What is claimed is:

1. A program controller for actuating a washing machine through a rinsing program comprising one or more cycles of successive operations, each of said cycles comprising the following sequence of operations; filling the washer tub with water, a rinsing operation, and draining the water from said tub, said controller comprising, a source of supply voltage, a first switching stage arranged to control said water filling operation, control means coupled to the output of said first switching stage and responsive to the condition thereof for sequentially controlling said washing machine through the rinsing and draining operations upon completion of said filling operation, a timing circuit including a resistor-capacitor network having an RC time constant for timing the rinse program, said timing circuit having an operative state determined by said RC time constant and which corresponds approximately to the period of a rinse program and a rest state which terminates said program, a first photosensitive resistor interconnecting said first switching stage with said source of supply voltage, a first light source electrically coupled to said timing circuit and optically coupled to said first photosensitive resistor so as to illuminate same in the operative state of said timing circuit, and switch means interconnecting said first switching stage with said source of supply voltage for initiating a rinse program by energizing said first stage.

2. A controller as described in claim 1 further comprising a second photosensitive resistor connected in series with said first photosensitive resistor in the interconnection between said first switching stage and said source of supply voltage, a second source of light electrically coupled to the output of said control means and optically coupled to said second photosensitive resistor, said control means including means for energizing said second light source at the end of the water drain operation and for a period of time that is short relative thereto, thereby to recycle said washing machine so long as said timing circuit remains in the operative state.

3. A controller as described in claim 2 wherein said timing circuit further comprises a second switching stage having an operative state and a rest state, means for coupling said resistor-capacitor network to the input of said second stage, a third photosensitive resistor connected in series with the capacitor of said resistor-capacitor network across said voltage source to provide a charge path therefor in the illuminated condition thereof, a third light source connected in circuit with said switch means across said voltage source and optically coupled to said third photosensitive resistor so as to illuminate same upon closure of said switch means.

4. A controller as described in claim 3 further comprising a fourth photosensitive resistor optically coupled to said third light source and connected in series therewith across said voltage source so as to maintain said third light source energized upon release of said switch means.

5. A controller as described in claim 4 further comprising a fifth photosensitive resistor connected in shunt with said third light source, a fourth light source optically coupled to said fifth photosensitive resistor and connected in the output circuit of said control means, said control means being operative to energize said fourth light source during the drain operation thereby to illuminate said fifth photosensitive resistor which in turn causes said third light source to extinguish and said timing circuit to begin the timing of the rinse program.

6. A program controller for actuating a washing machine through a rinsing program of one or more cycles of successive operations comprising, a source of supply voltage, first, second and third switching stages for sequentially controlling the washing machine through a rinse cycle consisting of a water filling operation, a rinsing operation, and a draining operation, respectively, a timing circuit comprising a fourth switching stage having an input circuit and an output circuit, a capacitor coupled to said input circuit for controlling said fourth stage, a resistor connected to said capacitor to provide a discharge path therefor having a time constant which determines the period of a rinse program, means for charging said capacitor from said supply voltage at the start of said rinse program, first optical coupling means interconnecting said first and second switching stages and arranged to initiate said rinsing operation by said second stage upon termination of the filling operation by said first stage, second optical coupling means interconnecting said second and third switching stages and arranged to initiate said draining operation by said third stage upon termination of the rinsing operation by said second stage, a first photosensitive resistor connected between said first switching stage and said source of supply voltage, a first light source coupled to the output circuit of said fourth switching stage and optically coupled to said first photosensitive resistor and arranged to illuminate same so long as the voltage across said capacitor exceeds a given voltage level, and switch means connected between said first switching stage and said source of supply voltage for initiating a rinse program upon closure thereof.

7. A controller as described in claim 6 further comprising a second photosensitive resistor connected in series with said first photosensitive resistor between said first switching stage and said source of supply voltage, a second light source optically coupled to said second photosensitive resistor and electrically coupled to the output of said third switching stage so as to be momentarily energized thereby at the end of the water drain operation, the simultaneous energization of said first and second photosensitive resistors being operative to initiate a new rinse cycle.

8. A controller as described in claim 7 wherein said capacitor charging means comprises a third photosensitive resistor connected in series with said capacitor across said supply voltage, a third light source optically coupled to said third photosensitive resistor, and means including said switch means for energizing said third light source during the first cycle of a rinse program thereby to illuminate said third photosensitive resistor to provide a low resistance charge path for said capacitor.

9. A controller as described in claim 8 further comprising a fourth photosensitive resistor connected in shunt with said third light source, a fourth light source optically coupled to said fourth photosensitive resistor and electrically coupled to the output of said third switching stage so as to be energized during the drain operation, the energization of said fourth light source during the first drain operation in said rinse program being operative to effectively short-circuit and thereby de-energize said third light source by driving said fourth photosensitive resistor into its low resistance state, said third photosensitive resistor being responsive to the de-energization of said third light source by increasing its resistance to effectively open the charge path of said capacitor thereby initiating the timing operation of the rinse program by allowing said capacitor to discharge via said discharge path.

10. A controller as described in claim 9 wherein said second switching stage includes a timing circuit comprising a second capacitor and a second resistor connected thereto to provide a discharge path therefor, said first optical coupling means comprising a fifth photosensitive resistor connected in series with said second capacitor across said voltage source to provide a charge path therefor and a fifth light source optically coupled to said fifth photosensitive resistor and electrically coupled to the output of said first switching stage and arranged to be energized during the water filling operation of a rinse cycle and to be de-energized thereafter, said fifth photosensitive resistor being responsive to the de-energization of said fifth light source by increasing its resistance to effectively open the charge path of said second capacitor thereby to initiate the timing operation of a rinse operation within a given rinse cycle by allowing said second capacitor to discharge via said second resistor.

11. A controller as described in claim 7 further comprising a third photosensitive resistor effectively connected in shunt with said switch means, and a third light source optically coupled to said third photosensitive resistor and electrically coupled to the output of said first switching stage so as to be energized during the filling operation, the combination of said third photosensitive resistor and said third light source being operative to maintain the energization of said first switching stage upon release of said switch means during the initial filling operation of the program.

References Cited

UNITED STATES PATENTS

| | | | |
|---|---|---|---|
| 2,086,157 | 7/1937 | Dumble | 68—12 X |
| 3,114,253 | 12/1963 | Morey et al. | 68—12 |
| 3,198,967 | 8/1965 | Roberts | 68—12 X |

WILLIAM I. PRICE, *Primary Examiner.*